US010625692B2

(12) United States Patent
Holdsworth et al.

(10) Patent No.: US 10,625,692 B2
(45) Date of Patent: Apr. 21, 2020

(54) PROTOTYPE WIRING SYNTHESIS

(71) Applicant: Mentor Graphics Corporation, Wilsonville, OR (US)

(72) Inventors: Simon Holdsworth, Tewkesbury (GB); Rory Harrington, Swindon (GB); David Barnes, Newbury (GB)

(73) Assignee: Mentor Graphics Corporation, Wilsonville, OR (US)

( * ) Notice: Subject to any disclaimer, the term of this patent is extended or adjusted under 35 U.S.C. 154(b) by 129 days.

(21) Appl. No.: 15/885,177

(22) Filed: Jan. 31, 2018

(65) Prior Publication Data
US 2019/0232894 A1 Aug. 1, 2019

(51) Int. Cl.
*G06F 17/50* (2006.01)
*B60R 16/02* (2006.01)

(52) U.S. Cl.
CPC ........ *B60R 16/0215* (2013.01); *G06F 17/509* (2013.01); *G06F 17/5068* (2013.01); *G06F 2217/36* (2013.01)

(58) Field of Classification Search
CPC . B60R 16/0215; B60R 16/0207; B60R 16/03; H01B 7/0045; H01R 2201/26; H01R 12/59; G06F 17/50; G06F 17/5095; G06F 2217/36
USPC .................. 716/101–104, 118, 126; 703/1–4
See application file for complete search history.

(56) References Cited

U.S. PATENT DOCUMENTS

| | | | | |
|---|---|---|---|---|
| 2009/0157209 A1* | 6/2009 | Holdsworth | ........ | G06F 17/5045 700/97 |
| 2010/0030546 A1* | 2/2010 | Dong | ................... | B60R 16/0207 703/14 |
| 2010/0031212 A1* | 2/2010 | Dong | ...................... | G06F 17/50 716/100 |
| 2011/0307100 A1* | 12/2011 | Schmidtke | ......... | G05B 19/4093 700/276 |
| 2015/0149459 A1* | 5/2015 | Hughes | ................... | G06F 16/22 707/736 |

OTHER PUBLICATIONS

Christian Van Der Velden et al, "A 3D Knowledge-Based Router for Wiring in Aerospace Vehicles", 25th International Congress of the Aeronautical Sciences, Sep. 8, 2006, pp. 1-8.

(Continued)

*Primary Examiner* — Nghia M Doan
(74) *Attorney, Agent, or Firm* — Mentor Graphics Corporation

(57) ABSTRACT

This application discloses a computing system to receive a specification of prototype wiring corresponding to a signal in a logical design of a wire harness, locate a section of a vehicle to include a portion of the wire harness corresponding to the signal in the logical design, and insert the prototype wiring into a physical design of the wire harness corresponding to the located section of the vehicle. The specification of the prototype wiring can identify a particular vehicle configuration and insert the prototype wiring into a physical design of the wire harness for the particular vehicle configuration. The computing system can receive constraints configured to control synthesis of the logical design into the physical design of the wire harness, and generate portions of the physical design of the wire harness based on the constraints, while retaining the prototype wiring that was inserted into the physical design.

20 Claims, 8 Drawing Sheets

(56) References Cited

OTHER PUBLICATIONS

Zaoxu Zhu et al., "A KBE Application for Automatic Aircraft Wire Harness Routing", 53rd AIAA/ASME/ASCE/AHS/ASC Structures, Structural Dynamics and Materials Conference, 20th AIAA/ASME/AHS Adaptive Structures Conference, 14th AIA, Apr. 23, 2012, Reston, VA, USA, pp. 1-10.

Nick Smith, Automating Wire Harness Design in Today's Automotive, Aerospace and Marine Industry, International Wire & Cable Symposium, Nov. 14, 2007, pp. 266-273.

* cited by examiner

PLATFORM DESIGN FLOW

EXAMPLE TWO-WIRE SPLICE

EXAMPLE REDUNDANT WIRE

EXAMPLE SPLICE VARIATION BY CONFIGURATION

PROTOTYPE WIRING SYNTHESIS

TECHNICAL FIELD

This application is generally related to electronic design automation and, more specifically, to a prototype wiring synthesis in wiring harness design.

BACKGROUND

The design of electrical and electronic systems or interconnects, such as wiring harnesses, for example, for implementation into vehicles, aircraft, boats, appliances, or other systems with distributed electronics, can include many different design stages or phases at different levels of abstraction. For example, some of the design phases can include a requirements phase, a functional phase, a logical phase, a physical or wiring phase, a components phase, which can include at least one of a topology section, a harness section, or the like, a formboard or manufacturing phase, and a service phase.

The traversal these various design phases utilizing design tools can allow for the design of the wiring harnesses. For example, a logical design of the wiring harness can be converted into one or more physical designs of the wiring harness utilizing a wiring synthesis tool, which can generate wires for the physical designs of the wiring harness from signals and their connectivity in the logical design of the wire harness. Typically, the wiring synthesis tool can receive the logical design of the wire harness and designer guidance in the form of constraints, and synthesize the signals in the logical design of the wire harness into wires for the physical designs of the wire harness based on the constraints. Often, however, the constraints available to the designer are insufficient to control the wiring synthesis tool to implement some portions of the physical design of the wire harness. Many wiring synthesis tools or their vendors supply designers with an editing tool, which can allow the designers the ability to manually alter the physical design of the wire harness synthesized by the wiring synthesis tool. While the editing tool can allow designers to ultimately generate a desired physical design of the wire harness, the manual editing or alteration can be time-consuming. Further, since, practically speaking, a majority of the design activity involves adjustment to existing wiring harness designs, each time the logical design of the wire harness has to be modified and re-synthesized, the designers have to re-perform the manual editing or alteration of the synthesized wiring harness.

SUMMARY

This application discloses a computing system implementing one or more tools or mechanism configured to receive a specification of prototype wiring corresponding to a signal in a logical design of a wire harness, locate a section of a vehicle to include a portion of the wire harness corresponding to the signal in the logical design, and insert the prototype wiring into a physical design of the wire harness corresponding to the located section of the vehicle. The specification of the prototype wiring can identify a particular vehicle configuration and insert the prototype wiring into a physical design of the wire harness for the particular vehicle configuration. The computing system can receive constraints configured to control synthesis of the logical design into the physical design of the wire harness, and generate portions of the physical design of the wire harness based on the constraints, while retaining the prototype wiring that was inserted into the physical design. These and other embodiments will be described below in greater detail.

DETAILED DESCRIPTION

Illustrative Operating Environment

Figure 1:
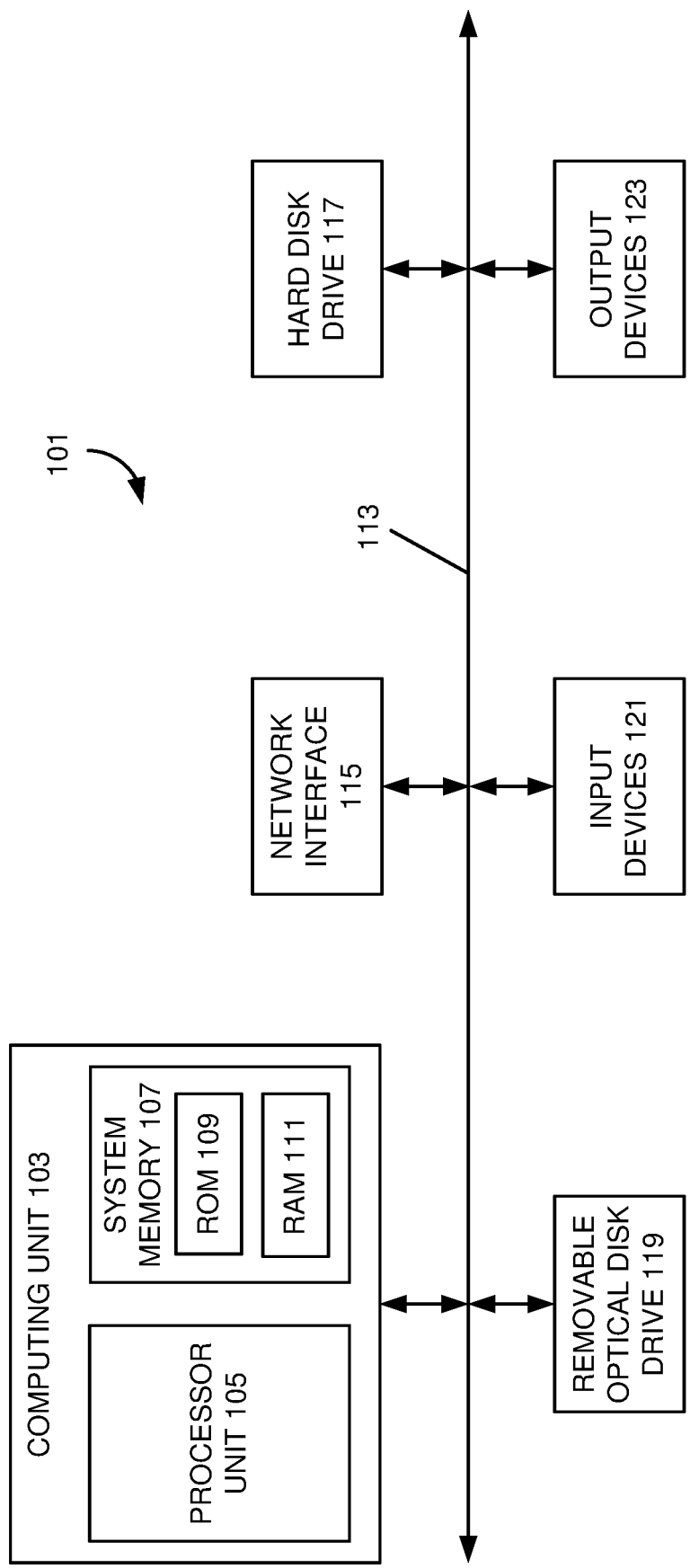
FIGS. 1 and 2 illustrate an example of a computer system of the type that may be used to implement various embodiments.

Various embodiments may be implemented through the execution of software instructions by a computing device 101, such as a programmable computer. Accordingly, FIG. 1 shows an illustrative example of a computing device 101. As seen in this figure, the computing device 101 includes a computing unit 103 with a processing unit 105 and a system memory 107. The processing unit 105 may be any type of programmable electronic device for executing software instructions, but will conventionally be a microprocessor. The system memory 107 may include both a read-only memory (ROM) 109 and a random access memory (RAM) 111. As will be appreciated by those of ordinary skill in the art, both the read-only memory (ROM) 109 and the random access memory (RAM) 111 may store software instructions for execution by the processing unit 105.

The processing unit 105 and the system memory 107 are connected, either directly or indirectly, through a bus 113 or alternate communication structure, to one or more peripheral devices 117-123. For example, the processing unit 105 or the system memory 107 may be directly or indirectly connected to one or more additional memory storage devices, such as a hard disk drive 117, which can be magnetic and/or removable, a removable optical disk drive 119, and/or a flash memory card. The processing unit 105 and the system memory 107 also may be directly or indirectly connected to one or more input devices 121 and one or more output devices 123. The input devices 121 may include, for example, a keyboard, a pointing device (such as a mouse, touchpad, stylus, trackball, or joystick), a scanner, a camera, and a microphone. The output devices 123 may include, for example, a monitor display, a printer and speakers. With various examples of the computing device 101, one or more of the peripheral devices 117-123 may be internally housed with the computing unit 103. Alternately, one or more of the peripheral devices 117-123 may be external to the housing for the computing unit 103 and connected to the bus 113 through, for example, a Universal Serial Bus (USB) connection.

With some implementations, the computing unit 103 may be directly or indirectly connected to a network interface 115 for communicating with other devices making up a network. The network interface 115 can translate data and control signals from the computing unit 103 into network messages according to one or more communication protocols, such as the transmission control protocol (TCP) and the Internet protocol (IP). Also, the network interface 115 may employ any suitable connection agent (or combination of agents) for connecting to a network, including, for example, a wireless transceiver, a modem, or an Ethernet connection. Such network interfaces and protocols are well known in the art, and thus will not be discussed here in more detail.

It should be appreciated that the computing device 101 is illustrated as an example only, and it not intended to be limiting. Various embodiments may be implemented using one or more computing devices that include the components of the computing device 101 illustrated in FIG. 1, which include only a subset of the components illustrated in FIG. 1, or which include an alternate combination of components, including components that are not shown in FIG. 1. For example, various embodiments may be implemented using a multi-processor computer, a plurality of single and/or multiprocessor computers arranged into a network, or some combination of both.

Figure 2:
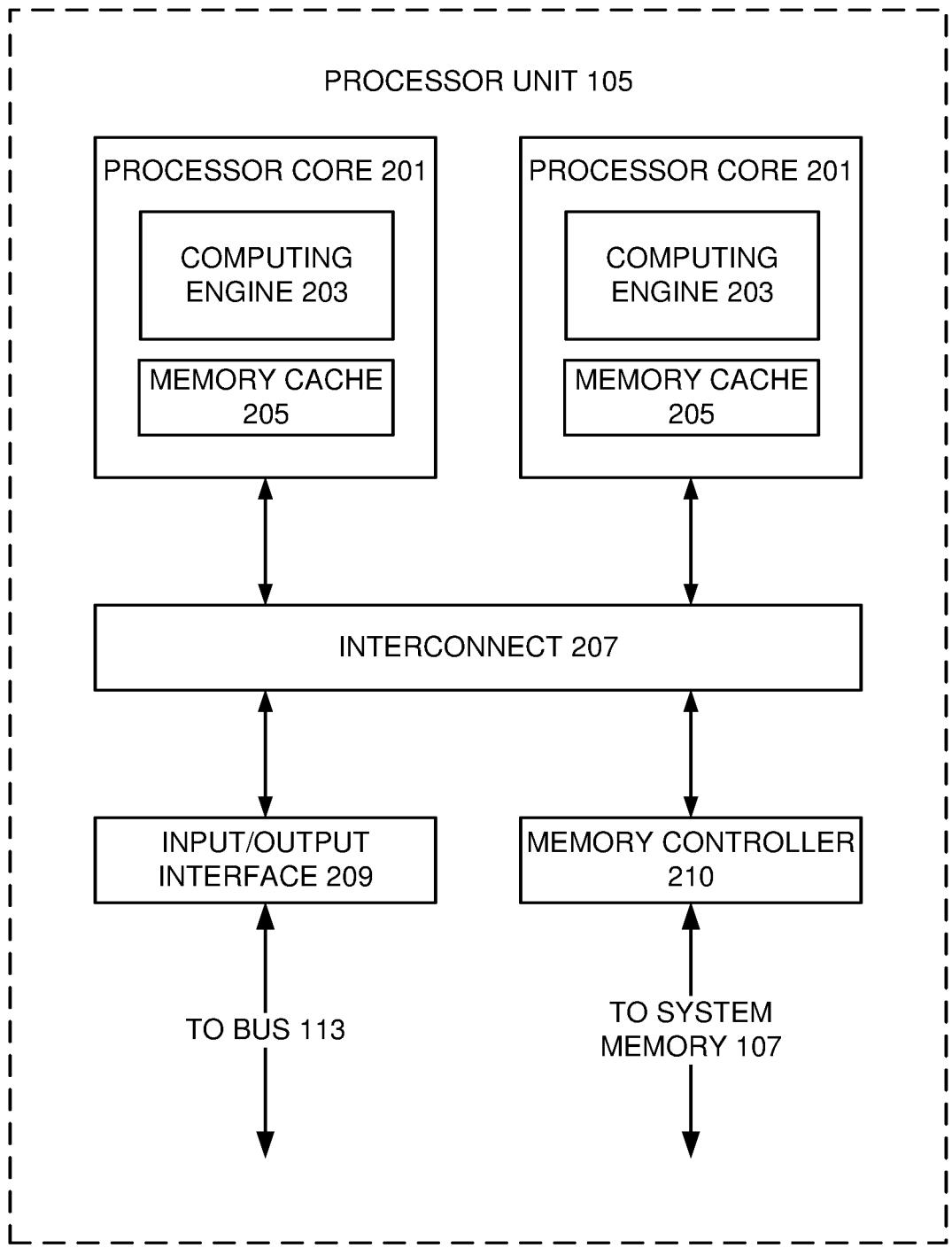

With some implementations, the processor unit 105 can have more than one processor core. Accordingly, FIG. 2 illustrates an example of a multi-core processor unit 105 that may be employed with various embodiments. As seen in this figure, the processor unit 105 includes a plurality of processor cores 201A and 201B. Each processor core 201A and 201B includes a computing engine 203A and 203B, respectively, and a memory cache 205A and 205B, respectively. As known to those of ordinary skill in the art, a computing engine 203A and 203B can include logic devices for performing various computing functions, such as fetching software instructions and then performing the actions specified in the fetched instructions. These actions may include, for example, adding, subtracting, multiplying, and comparing numbers, performing logical operations such as AND, OR, NOR and XOR, and retrieving data. Each computing engine 203A and 203B may then use its corresponding memory cache 205A and 205B, respectively, to quickly store and retrieve data and/or instructions for execution.

Each processor core 201A and 201B is connected to an interconnect 207. The particular construction of the interconnect 207 may vary depending upon the architecture of the processor unit 105. With some processor cores 201A and 201B, such as the Cell microprocessor created by Sony Corporation, Toshiba Corporation and IBM Corporation, the interconnect 207 may be implemented as an interconnect bus. With other processor units 201A and 201B, however, such as the Opteron™ and Athlon™ dual-core processors available from Advanced Micro Devices of Sunnyvale, Calif., the interconnect 207 may be implemented as a system request interface device. In any case, the processor cores 201A and 201B communicate through the interconnect 207 with an input/output interface 209 and a memory controller 210. The input/output interface 209 provides a communication interface to the bus 113. Similarly, the memory controller 210 controls the exchange of information to the system memory 107. With some implementations, the processor unit 105 may include additional components, such as a high-level cache memory accessible shared by the processor cores 201A and 201B. It also should be appreciated that the description of the computer network illustrated in FIG. 1 and FIG. 2 is provided as an example only, and it not intended to suggest any limitation as to the scope of use or functionality of alternate embodiments.

Illustrative Platform Design System

Figure 3A:
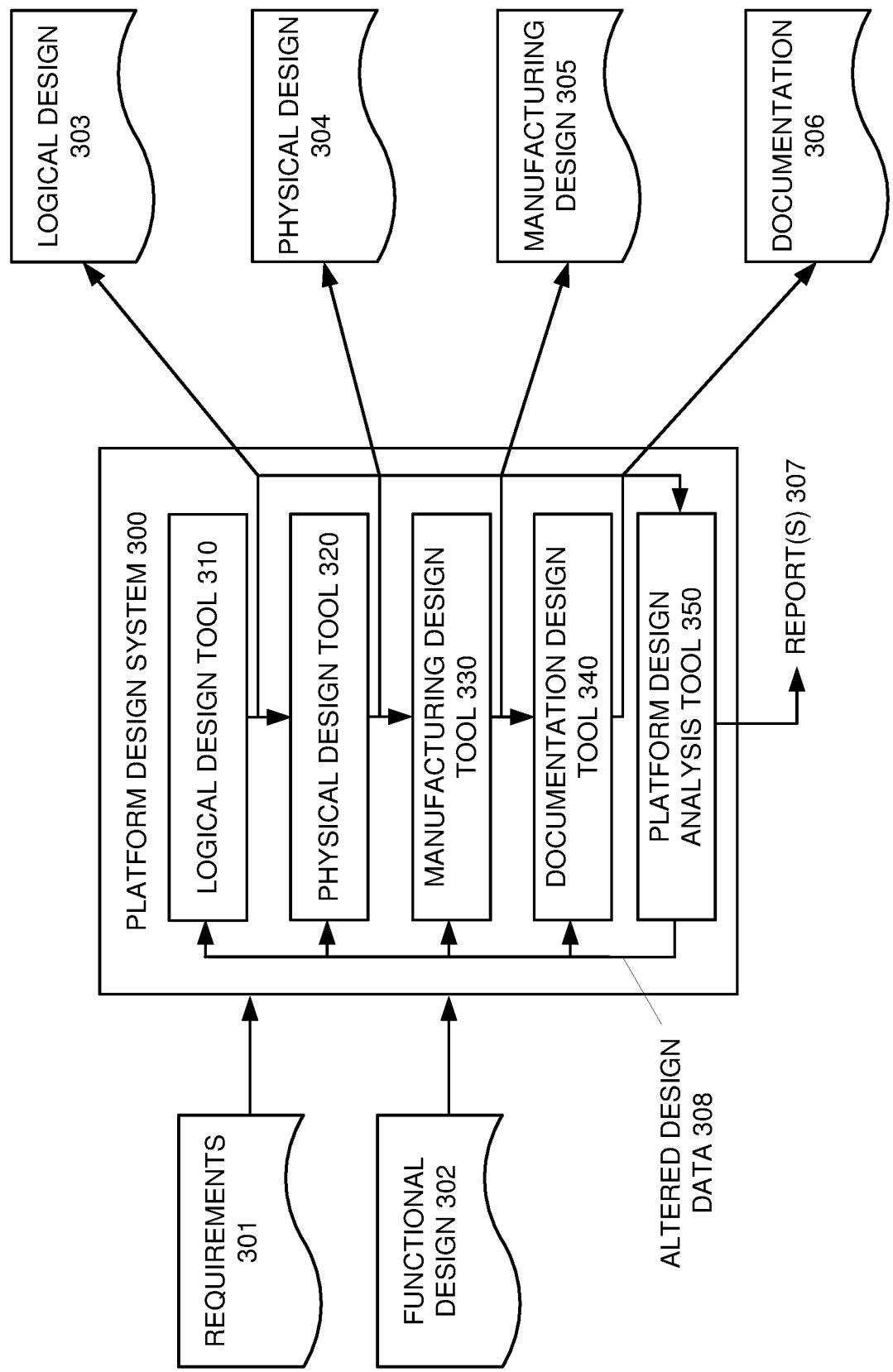
FIGS. 3A and 3B illustrate an example platform design system according to various embodiments.
Figure 3B:
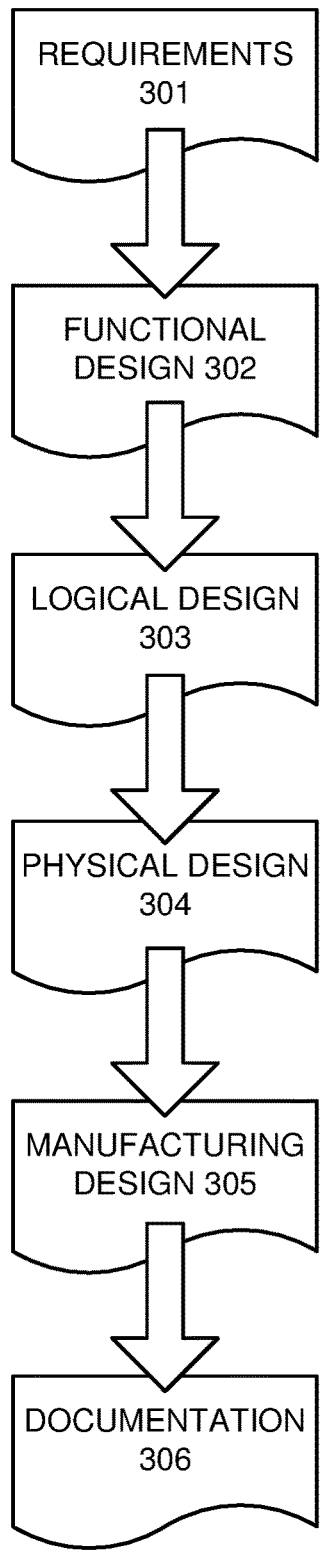

FIGS. 3A and 3B illustrate an example platform design system 300 according to various embodiments of the invention. Referring to FIGS. 3A and 3B, the platform design system 300 can include a set of one or more tools to develop at least a portion of an electronic system, such as a wiring harness. The development of the electronic system can be performed utilizing a platform design flow that includes multiple design stages, each representing the electronic system at a different level of abstraction.

The platform design flow can initially describe the electronic system as a set of requirements 301, for example, aspects, objectives, high-level operations, or the like, for the electronic system. The requirements 301 can be converted into a functional design 302, which can functionally describe the electronic system. The platform design flow continues by generating a logical design 303 for the electronic system. The logical design 303 can describe signals, their connectivity, and devices capable of implementing the functionality of the electronic system, for example, specified as a netlist or the like. The platform design flow can then include a physical design 304 that, in a wiring harness example, can describe the wires and components to physically implement the logical design 303. The platform design flow can then include a manufacturing design 305 that, in a wiring harness example, can describe specific harness components, such as mechanical structures, connectors, wire splices, or the like, as well as manufacturing aids, such as form boards, manufacturing tools, or the like. The platform design flow can include documentation 306 to describe manufacturing instructions, service or diagnostic information, decommissioning information, or the like, for the electronic system.

The platform design system 300 can include a logical design tool 310 to generate a logical design 303 for the electronic system, for example, based at least in part on the requirements 301 and the functional design 302 for the electronic system. In some embodiments, the logical design 303 can be a netlist for the electronic system, which can describe the signals, their connectivity, and devices capable of implementing the functionality of the electronic system. The logical design tool 310 can receive the requirements 301 and the functional design 302 from a device external to the platform design system 300 or, in some embodiments, the platform design system 300 can include other tools (not shown) that can build or generate the requirements 301 and the functional design 302 for the electronic system.

The platform design system 300 can include a physical design tool 320 to generate at least one physical design 304 based, at least in part, on the logical design 303. The physical design 304, in a wiring harness example, can describe the wires and components to physically implement the logical design 303. The physical design tool 320 can synthesize the physical design 304 from the logical design 303 utilizing a topology of a vehicle, synthesis constraints, prototype wiring specifications, or the like. In some embodiments, the physical design tool 320 can insert prototype wiring from the prototype wiring specifications into the physical design 304 and then synthesize the remaining portions of the logical design 303 into the physical design 304 based on the synthesis constraints.

In some embodiments, the vehicle or other electronic system can have multiple different configurations, such as right-hand drive vehicle, left-hand drive vehicle, different engine types, different wheel base sizes, or the like. The physical design tool 320 can identify the different vehicle configurations, for example, based on the logical design 303 and/or a topology of the vehicle, and generate a physical design 304 for each of the different vehicle configurations. Embodiments of the physical design tool will be described below in greater detail.

The platform design system 300 can include a manufacturing design tool 330 to generate a manufacturing design 305 based, at least in part, on the physical design 304. The manufacturing design 305, in the wiring harness example, can describe specific harness components, such as mechanical structures, connectors, wire splices, or the like, as well as manufacturing aids, such as form boards, manufacturing tools, or the like.

The platform design system 300 can include a documentation design tool 340 to generate a documentation 306 based, at least in part, on the manufacturing design 305. The documentation 306, in the wiring harness example, can describe manufacturing instructions, service or diagnostic information, decommissioning information, or the like, for the electronic system.

The platform design system 300 can include a platform design analysis tool 350 to analyze the requirements 301, the functional design 302, the logical design 303, the physical design 304, the manufacturing design 305, and/or the documentation 306, and automatically link them to each other across their levels of abstraction. Based on this linking, the platform design analysis tool 350 can generate reports 307, such as requirements tracking, impact assessment, or the like.

The platform design analysis tool 350 also can further analyze the linked designs, for example, by comparing two or more of the designs based on their linking for verification purposes, such as equivalence checking, design rule checking, or the like. Based on this comparison, the platform design analysis tool 350 can generate one or more of the reports 307, such as deltas that can describe differences between the compared designs and, in some embodiments, identifying alterations to one or more of the designs that could synchronize the compared designs.

The platform design analysis tool 350 also can automatically perform the identified synchronization, which can generate altered design data 308 capable of being provided to a corresponding tool in the platform design system. In some embodiments, the deltas can be executable, which can allow the platform design analysis tool 350 to automatically synchronize the compared designs described in the executable delta, for example, in response to a user input.

Physical Design Tool Implementing Prototype Wiring Synthesis

Figure 4:
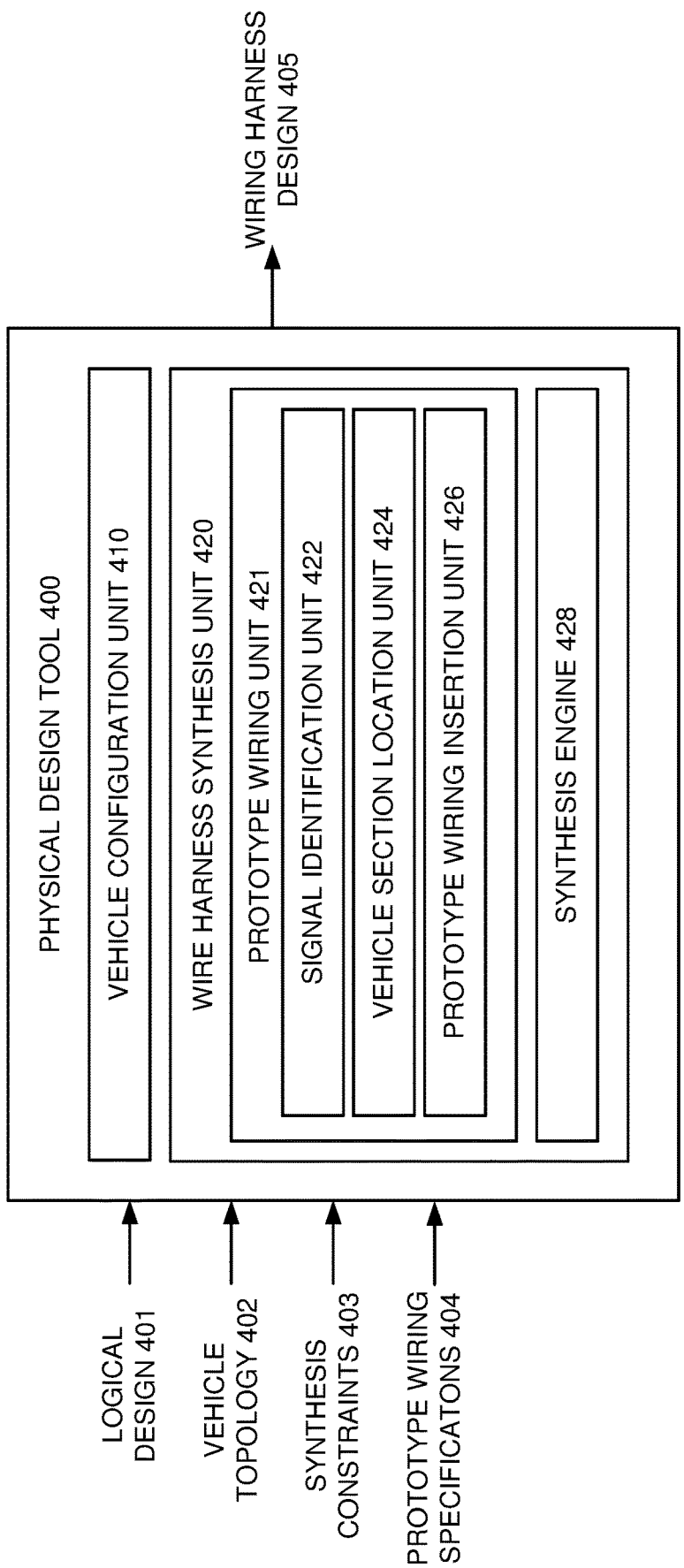
FIG. 4 illustrates an example of a physical design tool to implement prototype wiring synthesis according to various embodiments.

FIG. 4 illustrates an example of a physical design tool 400 to implement prototype wiring synthesis according to various embodiments. Referring to FIG. 4, the physical design tool 400 can receive a logical design 401 of a wiring harness, for example, from a logical design tool. The logical design tool can generate the logical design 401 of the wiring harness based, at least in part, on requirements for the wiring harness and a functional design for the wiring harness. In some embodiments, the logical design 401 can be a netlist for the wiring harness, which can describe signals, their connectivity, and devices capable of implementing the functionality of the wiring harness.

The physical design tool 400 can receive a vehicle topology 402, which includes two-dimensional plan views for various configurations of a vehicle or other electronic system and defines routing paths for the wiring harness through the various configurations of the vehicle or other electronic system. In some embodiments, the configurations for the vehicle or other electronic system can include a right-hand drive vehicle, left-hand drive vehicle, different engine types in the vehicle, different wheel base sizes for the vehicle, country-specific configurations, or the like.

The physical design tool 400 can receive synthesis constraints 403, which can be rules configured to at least in part control synthesis operations performed by a synthesis engine 428 in the physical design tool 400. The synthesis constraints 403 can define placement of wires and components in a wiring harness design 405 for specific signals from the logical design 401. The synthesis constraints 403 also can define paths for wires and components in the wiring harness design 405 for specific signals from the logical design 401. The synthesis constraints 403 also can define characteristics for implementation of specific signals, for example, a number of wires to implement the signal in the wiring harness design 405, an inclusion of a splice for the signal in the wiring harness design 405, or the like. The synthesis constraints 403 also can define physical attributes for wires in the wiring harness design 405, such as a color, size, gauge, material, or the like, for specific signals from the logical design 401. The synthesis constraints 403 also can define electrical characteristics of wires in the wiring harness design 405 for specific signals from the logical design 401. The synthesis constraints 403 also can define network protocol implementations of wires in the wiring harness design 405 for specific signals from the logical design 401.

The physical design tool 400 can receive a prototype wiring specification 404 to identify a signal in the logical design 401 and identify prototype wiring to insert in the wiring harness design 405 for the identified signal. The prototype wiring described in the prototype wiring specification 404 can specify wiring connectivity for all or part of the identified signal, which can include a physical implementation of wiring to include in the wiring harness design 405 for the identified signal. For example, the prototype wiring can be a pre-generated physical implementation of wiring, which can be included in the wiring harness design 405 for the identified signal. The specified connectivity of the prototype wiring can include a physical implementation of wiring, splices, wire attributes, such as size, color, gauge, material, or the like, wiring harness devices, wiring harness connectors, or the like. In some embodiments, the prototype wiring specification 404 also can identify at least one configuration of a vehicle or electronic system associated with the prototype wiring. In some embodiments, the physical design tool 400 can generate the prototype wiring specification 404 based on input from an application programming interface (API) or a user interface. For example, the input from the API or user interface can include drawings corresponding to the prototype wiring, a wiring diagram corresponding to the prototype wiring, definitions for the prototype wiring, or the like.

The physical design tool 400 can generate the wiring harness design 405 from the logical design 401. The wiring harness design 405 can correspond to a physical design describing the wires and components to physically implement the logical design 401. In some embodiments, the physical design tool 400 can generate the wiring harness design 405 by inserting prototype wiring in the wiring harness design 405 based on the prototype wiring specification 404 and/or by synthesizing the wiring and/or components based on the synthesis constraints 403.

The physical design tool 400 can include a vehicle configuration unit 410 to identify different configurations of a vehicle or electronic system, such as right-hand drive vehicle, left-hand drive vehicle, different engine types, different wheel base sizes, country-specific configurations, or the like. Each of the different configurations can have a different wiring harness design 405 generated by the physical design tool 400 from the logical design 401.

The physical design tool 400 can include a wire harness synthesis unit 420 to generate the wiring harness design 405 from the logical design 401 for each of the different configurations of the vehicle or the electronic system. The wire harness synthesis unit 420 can generate the wiring harness design 405 by inserting prototype wiring in the wiring harness design 405 based on the prototype wiring specification 404 and/or by synthesizing the wiring and/or components based on the synthesis constraints 403.

The wire harness synthesis unit 420 can include a prototype wiring unit 421 to insert prototype wiring in the wiring harness design 405 based on the prototype wiring specification 404. The prototype wiring unit 421 can include a signal identification unit 422 to identify a signal in the logical design 401 to physically implement in the wiring harness design 405. Since the prototype wiring specification 404 can indicate a signal associated with the prototype wiring in the prototype wiring specification 404, the signal identification unit 422 can parse the prototype wiring specification 404 to identify the signal in the logical design 401 to physically implement in the wiring harness design 405.

The prototype wiring unit 421 can include a vehicle section location unit 424 to determine a location in the vehicle for implementation of the signal identified by the signal identification unit 422. In some embodiments, the vehicle section location unit 424 can determine a connectivity of the signal in the logical design 401 and utilize the vehicle topology 402 to correlate the signal to a section of the vehicle based, at least in part, on the connectivity of the signal in the logical design 401. For example, the vehicle section location unit 424 can utilize the logical design 401 to determine the signal has connectivity to one or more harness components and then utilize the vehicle topology 402 to correlate the location of the harness components to the section of the vehicle. Since different configurations of the vehicle or electronic system can have different vehicle topologies, the vehicle section location unit 424 can determine the location in the vehicle for implementation of the signal on a per-configuration basis.

The prototype wiring unit 421 can include a prototype wiring insertion unit 426 to insert the prototype wiring from the prototype wiring specification 404 into the wiring harness design 405 at the determined location in the vehicle. In some embodiments, the prototype wiring can correspond to a complete physical implementation for the identified signal, while in other embodiments, the prototype wiring can correspond to a partial implementation, such as including one or more of physical wiring implementation, attributes of the physical wiring implementation, harness components, or the like.

The prototype wiring insertion unit 426 can perform at least one validity check on the prototype wiring to determine whether the prototype wiring has appropriate physical dimensions to be implemented in the determined location in the vehicle. For example, when the prototype wiring has a physical implementation that cannot fit within the defined routing paths corresponding to the determined location in the vehicle, the prototype wiring insertion unit 426 can detect an invalidity in the prototype wiring. In some embodiments, the prototype wiring insertion unit 426 can issue an error message in response to the detected invalidity of the prototype wiring and/or proceed with wire synthesis, for example, with the synthesis engine 428 of the physical design tool 400.

In some embodiments, the prototype wiring specification 404 can identify one or more configurations to implement the prototype wiring. In these embodiments, the prototype wiring insertion unit 426 can determine which configuration of the vehicle corresponds to the wiring harness design 405 being generated by the physical design tool 400 and selectively insert the prototype wiring into the wiring harness design 405 when on the determined configuration corresponds to at least one of the identified configurations in the prototype wiring specification 404.

The wire harness synthesis unit 420 can include a synthesis engine 428 to generate a remainder of the wiring harness design 405 based, at least in part, on the synthesis constraints 403. The synthesis engine 428 can identify signals in the logical design to synthesize into a physical implementation in the wiring harness design 405, determine locations in the vehicle to synthesize the identified signals based on the vehicle topology 402, and perform the synthesis of the identified signals based, at least in part, on the synthesis constraints 403. In some embodiments, the prototype wiring can be inserted into the wiring harness design 405 prior to synthesis by the synthesis engine 428, so the synthesis engine 428 retains the prototype wiring in wiring harness design 405, while generating additional wiring for the wiring harness design 405. In the embodiments, when the prototype wiring partial implements an identified signal, the synthesis engine 428 can complete the physical implementation of the identified signal in the wiring harness design 405, while retaining the prototype wiring or its characteristics that partial implemented an identified signal.

By generating the wiring harness design 405 through a combination of synthesis based on synthesis constraints 403 and prototype wiring insertion based on prototype wiring specifications 404, the physical design tool 400 can reduce manual editing of wiring harness designs synthesized or re-synthesized by the physical design tool 400. The physical design tool 400 also can provide a mechanism to allow for automated generation of features in a wiring harness design not capable of being synthesized based on synthesis constraints.

Figure 5:
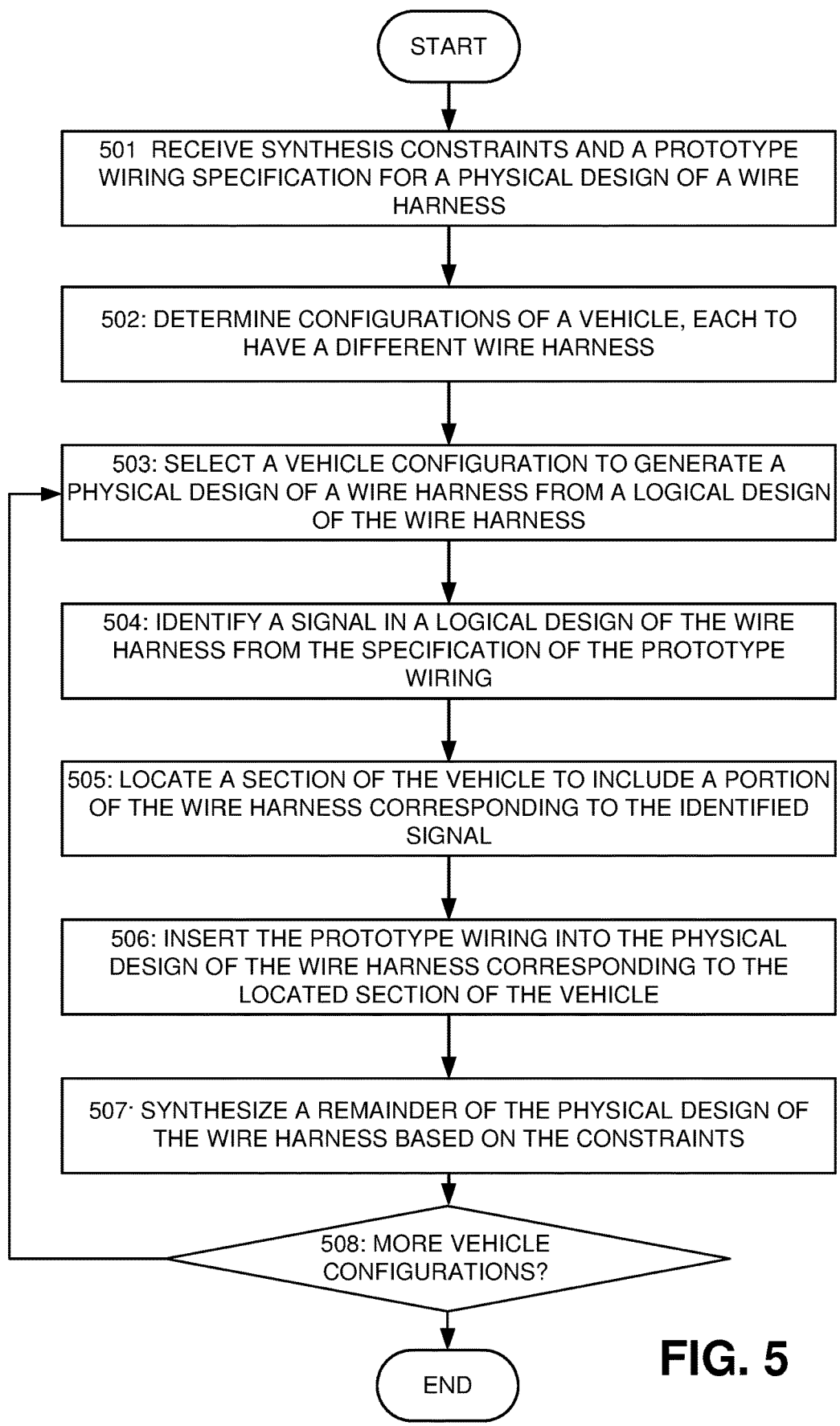
FIG. 5 illustrates a flowchart showing example operation of a physical design tool to implement prototype wiring synthesis tool according to various examples.

FIG. 5 illustrates a flowchart showing example operation of a physical design tool to implement prototype wiring synthesis tool according to various examples. Referring to FIG. 5, in a block 501, a computing system implementing the physical design tool can receive synthesis constraints and a prototype wiring specification for a physical design of a wire harness. The synthesis constraints can be rules configured to at least in part control synthesis operations performed by a synthesis engine. In some embodiments, the synthesis constraints can define placement of wires and components, define paths for wires and components define characteristics for implementation of specific signals, define physical attributes for wires, define electrical characteristics of wires, or define network protocol implementations of wires in the physical design of the wire harness.

The prototype wiring specification can identify a signal in a logical design of the wire harness and identify prototype wiring to insert in the physical design of the wire harness for the identified signal. The prototype wiring described in the prototype wiring specification can specify wiring connectivity for all or part of the identified signal, which can include a physical implementation of wiring to include in the physical design of the wire harness for the identified signal. The specified connectivity of the prototype wiring can include a physical implementation of wiring, splices, wire attributes, such as size, color, gauge, material, or the like, wiring harness devices, wiring harness connectors, or the like. In some embodiments, the prototype wiring specification also can identify at least one configuration of a vehicle or electronic system associated with the prototype wiring.

In a block 502, the computing system implementing the physical design tool can determine configurations of a vehicle, each to have a different wire harness. The different configurations of the vehicle can include configurations, such as right-hand drive vehicle, left-hand drive vehicle, different engine types, different wheel base sizes, country-specific configurations, or the like. Each of the different configurations can have a physical design for a wire harness.

In a block 503, the computing system implementing the physical design tool can select a vehicle configuration to generate a physical design of a wire harness from a logical design of the wire harness. In some embodiments, the computing system implementing the physical design tool can select multiple vehicle configurations and generate the physical designs of the wire harnesses for the multiple vehicle configurations at least partially in parallel.

In a block 504, the computing system implementing the physical design tool can identify a signal in a logical design of the wire harness from the specification of the prototype wiring. Since the prototype wiring specification can indicate a signal associated with the prototype wiring in the prototype wiring specification, the computing system implementing the physical design tool can parse the prototype wiring specification to identify the signal in the logical design to implement in the physical design of the wire harness.

In a block 505, the computing system implementing the physical design tool can locate a section of the vehicle to include a portion of the wire harness corresponding to the identified signal. In some embodiments, the computing system implementing the physical design tool can determine a connectivity of the signal in the logical design and utilize a vehicle topology to correlate the signal to a section of the vehicle based, at least in part, on the connectivity of the signal in the logical design. For example, the computing system implementing the physical design tool can utilize the logical design to determine the signal has connectivity to one or more harness components and then utilize the vehicle topology to correlate the location of the harness components to the section of the vehicle.

In a block 506, the computing system implementing the physical design tool can insert the prototype wiring into the physical design of the wire harness corresponding to the located section of the vehicle. The prototype wiring can correspond to a complete physical implementation for the identified signal or a partial implementation for the identified signal, such as including one or more of physical wiring implementation, attributes of the physical wiring implementation, harness components, or the like. When the prototype wiring specification identifies one or more configurations to implement the prototype wiring, the computing system implementing the physical design tool can determine which configuration of the vehicle corresponds to the physical design of the wire harness currently being generated and selectively insert the prototype wiring into the physical design of the wire harness when on the determined configuration corresponds to at least one of the identified configurations in the prototype wiring specification.

In a block 507, the computing system implementing the physical design tool can synthesize a remainder of the physical design of the wire harness based on the constraints. The computing system implementing the physical design tool can identify signals in the logical design to synthesize into a physical implementation in the physical design of the wire harness, determine locations in the vehicle to synthesize the identified signals based on the vehicle topology, and perform the synthesis of the identified signals based, at least in part, on the synthesis constraints. In some embodiments, the prototype wiring can be inserted into the physical design of the wire harness prior to synthesis, so the prototype wiring in physical design of the wire harness can be retained during generation of additional wiring for the physical design of the wire harness during synthesis. In the embodiments, when the prototype wiring partial implements an identified signal, the computing system implementing the physical design tool can complete the physical implementation of the identified signal in the physical design of the wire harness during synthesis, while retaining the prototype wiring or its characteristics that partial implemented an identified signal.

In a block 508, the computing system implementing the physical design tool can determine whether there are any additional vehicle configurations to select for generation of additional physical designs of wire harnesses. When the computing system implementing the physical design tool determines that at least one additional vehicle configuration is to be selected, execution proceeds back to block 503, where at least one of the additional vehicle configurations can be selected for generation of additional physical designs of wire harnesses; otherwise, the computing system implementing the physical design tool can output the physical design(s) of the wire harness(es).

Figure 6A:
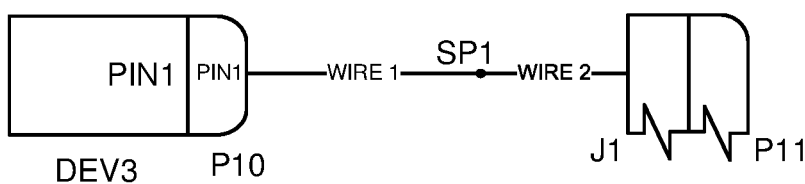
FIG. 6A-6E illustrates examples of prototype wiring in prototype wiring specifications according to various examples.

FIG. 6A-6E illustrates examples of prototype wiring in prototype wiring specifications according to various examples. Referring to FIG. 6A, prototype wiring 600 can correspond to a two-wire splice utilized to implement a wire gauge change between a first pin PIN1 in a device DEV3 via a connector P10 and an inline connector J1. The prototype wiring 600 can be specified at a physical level of abstraction, for example, as a physical implementation for a signal or net in a logical design. The prototype wiring 600 shows a first wire WIRE1 coupled between the first pin PIN1 in the device DEV3 via the connector P10 and a splice component SP1, and shows a second wire WIRE2 coupled between the splice component and the inline connector J1. When generating a physical design for a wiring harness that implements a signal between the first pin PIN1 in the device DEV3 via the connector P10 and the inline connector J1, the prototype wiring 600 can be inserted into the physical design for the wiring harness rather than attempting to synthesize the wiring and then manually editing the synthesized wiring.

Figure 6B:
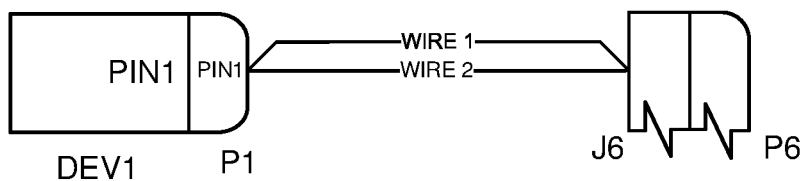

Referring to FIG. 6B, prototype wiring 610 can correspond to redundant wiring utilized to implement large wire gauges between a first pin PIN1 in a device DEV1 via a connector P1 and an inline connector J6. The prototype wiring 610 can be specified at a physical level of abstraction, for example, as a physical implementation for a signal or net in a logical design. The prototype wiring 610 shows a first wire WIRE1 and a second wire WIRE2 both coupled between the first pin PIN1 in the device DEV1 via the connector P1 and the inline connector J6. When generating a physical design for a wiring harness that implements a signal between the first pin PIN1 in the device DEV1 via the connector P1 and the inline connector J6, the prototype wiring 610 can be inserted into the physical design for the wiring harness rather than attempting to synthesize the wiring and then manually editing the synthesized wiring.

Figure 6C:
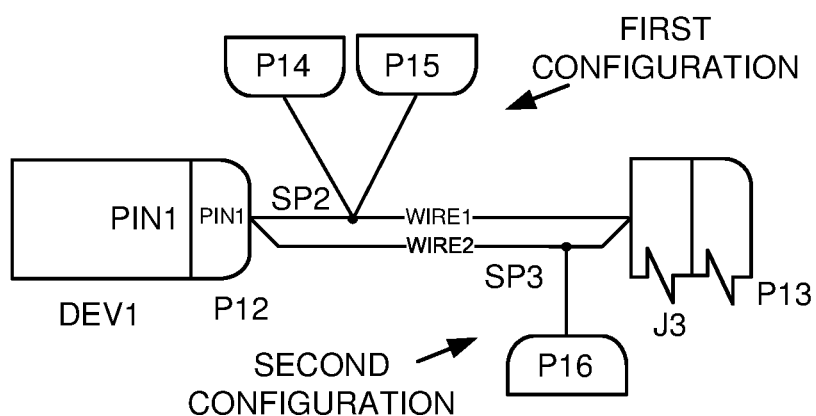

Referring to FIG. 6C, prototype wiring 620 can correspond to a splice variation for different configurations between a first pin PIN1 in a connector P12 and a inline connector J3. The prototype wiring 620 can be specified at a physical level of abstraction, for example, as a physical implementation for a signal or net in a logical design. The prototype wiring 620 can include wiring between a first pin PIN1 in a device DEV1 via the connector P12 and an inline connector J3 for a first configuration and for a second configuration. The prototype wiring 620 for the first configuration can include a first wire WIRE1 between the first pin PIN1 in the device DEV1 via the connector P12 and the inline connector J3, which includes a splice SP2 coupling to connectors P14 and P15 to the wire WIRE1. The prototype wiring 620 for the second configuration can include a second wire WIRE2 between the first pin PIN1 in the device DEV1 via the connector P12 and the inline connector J3, which includes a splice SP3 coupling to connector P16 to the wire WIRE2. When generating a physical design for a wiring harness corresponding to the first configuration, the prototype wiring 620 for the first configuration can be inserted into the physical design for the wiring harness. When generating the physical design for the wiring harness corresponding to the second configuration, the prototype wiring 620 for the second configuration can be inserted into the physical design for the wiring harness.

Figure 6D:
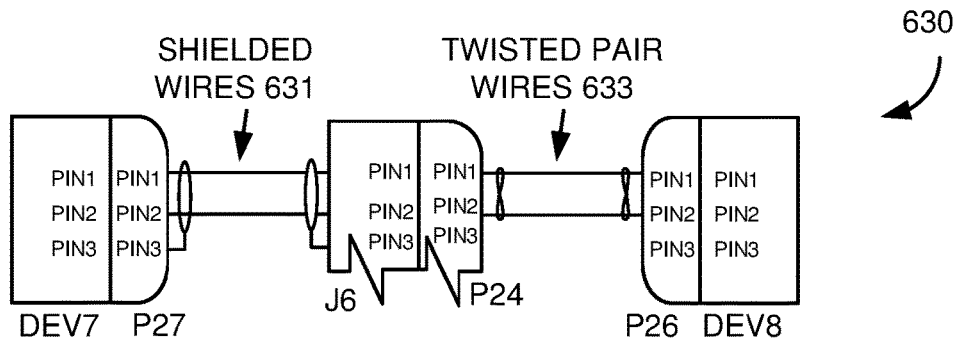

Referring to FIG. 6D, prototype wiring 630 can correspond to a multicore type change between shielded wires 631 into twisted pair wires 632. The prototype wiring 630 can include shielded wires 631 coupled between a device DEV7 via a connector P27 and an inline connector J6, and include twisted pair wires 632 coupled between the inline connector J6 via a connector P24 and a device DEV8 via a connector 26. The prototype wiring 630 can be specified at a physical level of abstraction, for example, as a physical implementation for a signal or net in a logical design. The prototype wiring 630 can be inserted into the physical design for the wiring harness.

Figure 6E:
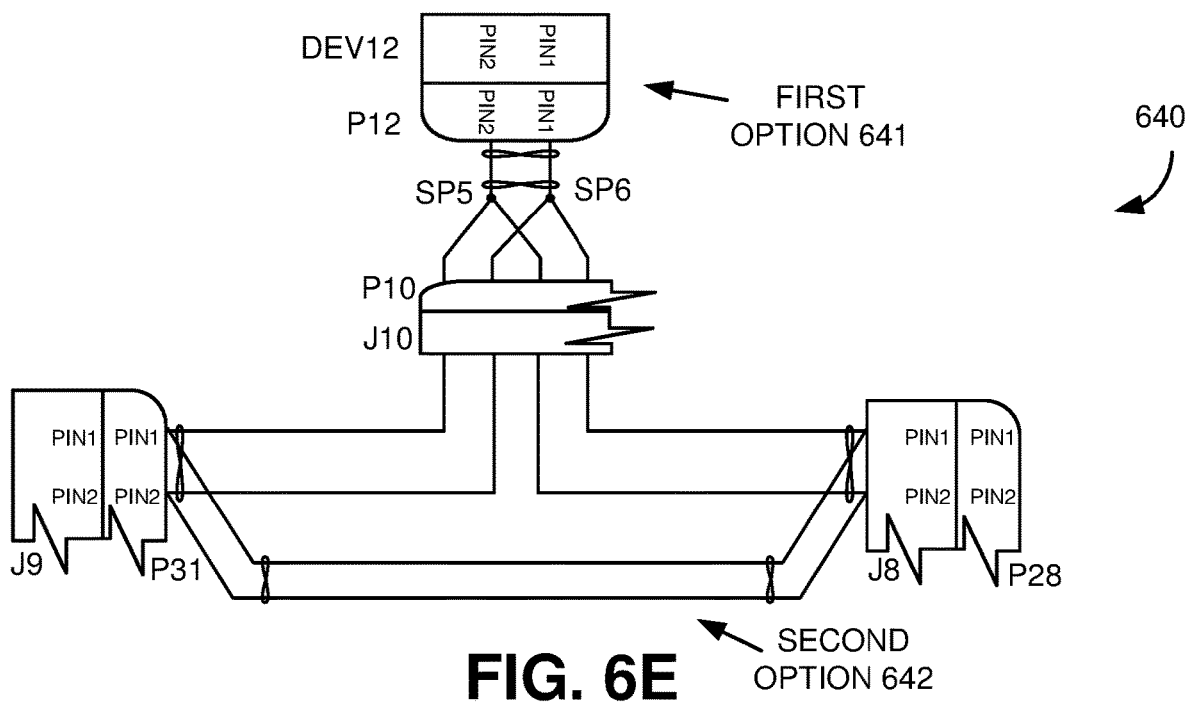

Referring to FIG. 6E, prototype wiring 640 can correspond to a multicore bypass inline for different options between pins of an inline connector J9 via a connector P31 and pins of an inline connector J8. The prototype wiring 630 can include a first option 641, which can include twisted pair wires from the pins of the inline connector J9 via the connector P31 and twisted pair wires from the pins of the inline connector J8 coupling to an inline connector J10. The inline connector J10 via a connecter P10 can be coupled with four wires—a first two of the four wires coupled to a 3-wire splice SP5, while a remaining two wires of the four wires can be coupled to a 3-wire splice SP6. Both of the splices SP5 and SP6 can be coupled to device DEV12 through a connecter P12 via twisted pair wires. The second option 642 can correspond to a bypass inline, which can couple the twisted pair wires from the pins of the inline connector J9 via the connecter P31 with the twisted pair wires from the pins of the inline connector J8. The prototype wiring 640 can be specified at a physical level of abstraction, for example, as a physical implementation for a signal or net in a logical design. When generating a physical design for a wiring harness corresponding to the first option, the prototype wiring 640 for the first option can be inserted into the physical design for the wiring harness. When generating the physical design for the wiring harness corresponding to the second option, the prototype wiring 640 for the second option can be inserted into the physical design for the wiring harness.

The system and apparatus described above may use dedicated processor systems, micro controllers, programmable logic devices, microprocessors, or any combination thereof, to perform some or all of the operations described herein. Some of the operations described above may be implemented in software and other operations may be implemented in hardware. Any of the operations, processes, and/or methods described herein may be performed by an apparatus, a device, and/or a system substantially similar to those as described herein and with reference to the illustrated figures.

The processing device may execute instructions or "code" stored in memory. The memory may store data as well. The processing device may include, but may not be limited to, an analog processor, a digital processor, a microprocessor, a multi-core processor, a processor array, a network processor, or the like. The processing device may be part of an integrated control system or system manager, or may be provided as a portable electronic device configured to interface with a networked system either locally or remotely via wireless transmission.

The processor memory may be integrated together with the processing device, for example RAM or FLASH memory disposed within an integrated circuit microprocessor or the like. In other examples, the memory may comprise an independent device, such as an external disk drive, a storage array, a portable FLASH key fob, or the like. The memory and processing device may be operatively coupled together, or in communication with each other, for example by an I/O port, a network connection, or the like, and the processing device may read a file stored on the memory. Associated memory may be "read only" by design (ROM) by virtue of permission settings, or not. Other examples of memory may include, but may not be limited to, WORM, EPROM, EEPROM, FLASH, or the like, which may be implemented in solid state semiconductor devices. Other memories may comprise moving parts, such as a known rotating disk drive. All such memories may be "machine-readable" and may be readable by a processing device.

Operating instructions or commands may be implemented or embodied in tangible forms of stored computer software (also known as "computer program" or "code"). Programs, or code, may be stored in a digital memory and may be read by the processing device. "Computer-readable storage medium" (or alternatively, "machine-readable storage medium") may include all of the foregoing types of memory, as well as new technologies of the future, as long as the memory may be capable of storing digital information in the nature of a computer program or other data, at least temporarily, and as long at the stored information may be "read" by an appropriate processing device. The term "computer-readable" may not be limited to the historical usage of "computer" to imply a complete mainframe, mini-computer, desktop or even laptop computer. Rather, "computer-readable" may comprise storage medium that may be readable by a processor, a processing device, or any computing system. Such media may be any available media that may be locally and/or remotely accessible by a computer or a processor, and may include volatile and non-volatile media, and removable and non-removable media, or any combination thereof.

A program stored in a computer-readable storage medium may comprise a computer program product. For example, a storage medium may be used as a convenient means to store or transport a computer program. For the sake of convenience, the operations may be described as various interconnected or coupled functional blocks or diagrams. However, there may be cases where these functional blocks or diagrams may be equivalently aggregated into a single logic device, program or operation with unclear boundaries.

CONCLUSION

While the application describes specific examples of carrying out embodiments, those skilled in the art will appreciate that there are numerous variations and permutations of the above described systems and techniques that fall within the spirit and scope of the invention as set forth in the appended claims.

One of skill in the art will also recognize that the concepts taught herein can be tailored to a particular application in many other ways. In particular, those skilled in the art will recognize that the illustrated examples are but one of many alternative implementations that will become apparent upon reading this disclosure.

Although the specification may refer to "an", "one", "another", or "some" example(s) in several locations, this does not necessarily mean that each such reference is to the same example(s), or that the feature only applies to a single example.

The invention claimed is:

1. A method comprising:
   receiving, by a computing system, a specification of prototype wiring corresponding to a signal in a logical design of a wire harness, wherein the prototype wiring corresponds to a physical implementation of wiring for inclusion in a physical design of the wiring harness;
   locating, by the computing system, a section of a vehicle to include a portion of the wire harness corresponding to the signal in the logical design of the wire harness;
   inserting, by the computing system, the prototype wiring into the physical design of the wire harness corresponding to the located section of the vehicle; and
   synthesizing, by the computing system, portions of the logical design of the wire harness into portions of the physical design of the wire harness, while retaining the prototype wiring that was inserted into the physical design of the wire harness.

2. The method of claim 1, further comprising receiving, by the computing system, constraints configured to control synthesis of the logical design of the wire harness into the physical design of the wire harness, wherein synthesizing the portions of the physical design of the wire harness is performed based on the constraints.

3. The method of claim 1, further comprising:
   determining, by the computing system, multiple vehicle configurations, each to have a different physical design of the wire harness, wherein the specification of the prototype wiring identifies at least one of the vehicle configurations corresponds to the prototype wiring; and
   inserting, by the computing system, the prototype wiring into the physical design of the wire harness associated with the at least one vehicle configuration identified by the specification of the prototype wiring.

4. The method of claim 1, wherein locating the section of the vehicle further comprises identifying connectivity of the signal in the logical design, and correlating the signal to the section of the vehicle based, at least in part, on the connectivity and a topology of the vehicle.

5. The method of claim 4, wherein the identifying the connectivity of the signal in the logical design further comprises matching the signal to one or more harness components correlated to the section of the vehicle.

6. The method of claim 4, wherein the topology of the vehicle includes a two-dimensional plan view of the vehicle with defined routing paths for the wire harness.

7. The method of claim 1, wherein the prototype wiring includes at least one of one or more wires to implement the signal, connectivity of the wires, an attribute of the wires, or a splice for the wires.

8. A system comprising:
   a memory system configured to store computer-executable instructions; and
   a computing system, in response to execution of the computer-executable instructions, is configured to:
   receive a specification of prototype wiring corresponding to a signal in a logical design of a wire harness, wherein the prototype wiring corresponds to a physical implementation of wiring for inclusion in a physical design of the wiring harness;
   locate a section of a vehicle to include a portion of the wire harness corresponding to the signal in the logical design of the wire harness;
   insert the prototype wiring into the physical design of the wire harness corresponding to the located section of the vehicle; and
   synthesize portions of the logical design of the wire harness into portions of the physical design of the wire harness, while retaining the prototype wiring that was inserted into the physical design of the wire harness.

9. The system of claim 8, wherein the computing system, in response to execution of the computer-executable instructions, is further configured to:
   receive constraints configured to control synthesis of the logical design of the wire harness into the physical design of the wire harness; and
   synthesize the portions of the physical design of the wire harness based on the constraints.

10. The system of claim 8, wherein the computing system, in response to execution of the computer-executable instructions, is further configured to:
    determine multiple vehicle configurations, each to have a different physical design of the wire harness, wherein the specification of the prototype wiring identifies at least one of the vehicle configurations corresponds to the prototype wiring; and
    insert the prototype wiring into the physical design of the wire harness associated with the at least one vehicle configuration identified by the specification of the prototype wiring.

11. The system of claim 8, wherein the computing system, in response to execution of the computer-executable instructions, is further configured to locate the section of the vehicle by identifying connectivity of the signal in the logical design, and correlating the signal to the section of the vehicle based, at least in part, on the connectivity and a topology of the vehicle.

12. The system of claim 11, wherein the computing system, in response to execution of the computer-executable instructions, is further configured to identify the connectivity of the signal in the logical design by matching the signal to one or more harness components correlated to the section of the vehicle.

13. The system of claim 8, wherein the prototype wiring includes at least one of one or more wires to implement the signal, connectivity of the wires, an attribute of the wires, or a splice for the wires.

14. An apparatus comprising at least one computer-readable memory device storing instructions configured to cause one or more processing devices to perform operations comprising:
    identifying a specification of prototype wiring corresponding to a signal in a logical design of a wire harness, wherein the prototype wiring corresponds to a physical implementation of wiring for inclusion in a physical design of the wiring harness;

locating a section of a vehicle to include a portion of the wire harness corresponding to the signal in the logical design of the wire harness;

inserting, by the computing system, the prototype wiring into the physical design of the wire harness corresponding to the located section of the vehicle; and synthesizing, by the computing system, portions of the logical design of the wire harness into portions of the physical design of the wire harness, while retaining the prototype wiring that was inserted into the physical design of the wire harness.

15. The apparatus of claim 14, wherein the instructions are configured to cause one or more processing devices to perform operations further comprising identifying constraints configured to control synthesis of the logical design of the wire harness into the physical design of the wire harness, wherein synthesizing the portions of the physical design of the wire harness is performed based on the constraints.

16. The apparatus of claim 14, wherein the instructions are configured to cause one or more processing devices to perform operations further comprising:

determining multiple vehicle configurations, each to have a different physical design of the wire harness, wherein the specification of the prototype wiring identifies at least one of the vehicle configurations corresponds to the prototype wiring; and inserting the prototype wiring into the physical design of the wire harness associated with the at least one vehicle configuration identified by the specification of the prototype wiring.

17. The apparatus of claim 14, wherein locating the section of the vehicle further comprises identifying connectivity of the signal in the logical design, and correlating the signal to the section of the vehicle based, at least in part, on the connectivity and a topology of the vehicle.

18. The apparatus of claim 17, wherein the identifying the connectivity of the signal in the logical design further comprises matching the signal to one or more harness components correlated to the section of the vehicle.

19. The apparatus of claim 17, wherein the topology of the vehicle includes a two-dimensional plan view of the vehicle with defined routing paths for the wire harness.

20. The apparatus of claim 14, wherein the prototype wiring includes at least one of one or more wires to implement the signal, connectivity of the wires, an attribute of the wires, or a splice for the wires.

* * * * *